United States Patent Office 2,996,541
Patented Aug. 15, 1961

2,996,541
PURIFICATION OF p(N-ACETYL AMINO) BENZENE SULFONYL CHLORIDE
Sidney Beinfest and Phillip Adams, Berkeley Heights, and John F. Marshik, Summit, N.J., assignors to Berkeley Chemical Corporation, Berkeley Heights, N.J., a corporation of New Jersey
No Drawing. Filed Oct. 3, 1958, Ser. No. 765,023
5 Claims. (Cl. 260—543)

This invention relates to an improved process for recovering and purifying aromatic particularly substituted aromatic sulfonyl chlorides. More particularly it relates to a process of that nature wherein by the controlled addition of water to a reaction mixture containing, e.g. p(N-acetyl amino) benzene sulfonyl chloride, the latter is recovered and obtained in relatively anhydrous form and other product streams are recovered in a state suitable for use or re-sale.

p(N-acetyl amino) benzene sulfonyl chloride is a well-known chemical synthetic intermediate. It has found particular use in the manufacture of sulphonamide drugs. One of the problems in its commercial distribution is to obtain it in marketable form in a sufficiently dry state. This is necessary because the chemical normally hydrolyzes and decomposes when wet. The problem of purifying and obtaining the chemical in relatively dry form is well recognized and many attempts have been made to provide satisfactory methods of doing so.

p(N-acetyl amino) benzene sulfonyl chloride like other aromatic sulfonyl chlorides is conventionally prepared by the reaction of chlorosulfonic acid with an aromatic compound, e.g., acetanilide. The consequent reaction mixture, therefore, contains p(N-acetyl amino) benzene sulfonyl chloride, sulfuric acid, unreacted chlorosulfonic acid as well as some byproducts.

This reaction mixture has been conventionally purified by two general procedures. In the first, the reaction mixture is added to ice to keep the temperature low to prevent hydrolysis. The reaction mixture, containing the resultant slurry of p(N-acetyl amino) benzene sulfonyl chloride is then filtered and washed with cold water. Since the solid product crystals are in the form of a flocculent mixture they are difficult to filter. The final filter cake therefore contains about 50% water. This cake after water washing is then dissolved in a water immiscible organic solvent such as ethylacetate, methylene chloride, methyl isobutyl ketone, acetone plus toluene, ethylene dichloride, etc., and the water layer is discarded. Any water contained in the organic layer is azeotroped off and the p(N-acetyl amino) benzene sulfonyl chloride is obtained in crystalline form by solvent evaporation followed by crystallization.

As an alternative to the first method, large quantities of solvent can be added to the acid slurry in place of filtration after the addition to ice. The solvent containing the product is washed with water to remove the acid and then the crystals are obtained in the same manner as previously.

These preceding processes give rise to several difficulties. The p(N-acetyl amino) benzene sulfonyl chloride as filtered is a flocculent mixture and the filter cake in the first method contains large quantities of water, up to 50 weight percent. In the second method uneconomic quantities of solvent are required and solvent losses in the dilute acid mixture are entailed.

This invention provides an improved method of overcoming the beforementioned difficulties. The method comprises purifying aromatic sulfonyl chlorides prepared from the reaction of chlorosulfonic acid with the aromatic hydrocarbon and present in a reaction mixture comprising a solution of aromatic sulfonyl chloride, e.g. p(N-acetyl amino) benzene sulfonyl chloride, chlorosulfonic acid and sulfuric acid by adding water slowly to the reaction mixture. The water is added slowly in an amount sufficient only to react with all the free chlorosulfonic acid as shown so as to evolve the HCl:

$$ClSO_3H + H_2O \rightarrow HCl\uparrow + H_2SO_4$$

Additional water is added in an amount only about sufficient to precipitate substantially only the sulfonyl chloride and retain the other byproducts in solution. This also results in the retention of the sulfuric acid in a relatively concentrated form. The amount of water added varies with the different sulfonyl chlorides being prepared and is easily determined. The temperature is maintained in the range of 20° to 60° C. by agitation, external cooling and rate of water addition. The resultant mixture is then aged for a minimum time of about 30 minutes to promote crystal growth. The crystals of aromatic sulfonyl chloride are then separated from the residual mixture, preferably by filtration, and then washed with water. By this method large crystals are obtained as contrasted to the much smaller crystals obtained previously and in addition these large crystals are easily filterable. The filter cake consequently contains a maximum of about 15, usually 10 wt. percent water as contrasted to the much higher figures of the art.

In preferred modifications of this invention small amounts of an organic solvent for the aromatic sulfonyl chloride can also be added to the treated reaction mixture after the HCl evolution has ceased. These organic solvents are characterized by being immiscible and non-reactive with sulfuric acid in the concentrations it is found in the treated reaction mixture. The amount of organic solvent added is conveniently about 10–15 wt. percent based on the dry sulfonyl chloride product obtained. Examples of the organic solvents utilized include chlorinated aliphatic hydrocarbons such as ethylene dichloride, $CHCl_3$, higher ketones, nitropropane, etc. The effect of the added organic solvent is to facilitate the growth of crystal size.

The aromatic sulfonyl chlorides to which this process is applicable include p(N-acetyl amino) benzene sulfonyl chloride, toluene sulfonyl chlorides, para chlorobenzene sulfonyl chloride, carbanilide disulfonyl chloride, etc. The process is particularly suitable for N-acyl amino benzene sulfonyl chlorides because of the lower water stability of these materials.

The process of this invention additionally permits of the recovery of streams of useful products in a state suitable for use or re-sale. Thus the controlled addition of water as indicated results in the evolution of gaseous HCl which is recovered. The residual reaction mixture, after separation of the p(N-acetyl amino) benzene sulfonyl chloride product crystals is then conveniently heated to a temperature in the range of 110 to 120° C. This results in the conversion of an acetyl amino benzene sulfonic acid to sulfanilic acid precipitate which is then also separated and recovered by filtration in pure form for re-sale. For other than acyl amino benzene sulfonyl chloride product this heating is not necessary.

These prior treatments finally leave sulfuric acid of a concentration suitable for re-sale or use.

The obtaining of these commercially useful byproducts of the reaction is particularly to be contrasted with the technique of drowning the reaction mixture in ice. The water added to the reaction mixture can also contain some $H_2SO_4$ or HCl, e.g. 50% $H_2SO_4$ or 34% HCl, e.g. dilute mineral acids. Thus streams recovered in the process can be utilized for this purpose to facilitate better product recovery such as HCl.

This invention will be better understood by reference to the following example of the purification of various sulfonyl chlorides and the recovery of the valuable products according to the method of this invention.

*Example I*

A reaction mixture obtained from 135 g. (1 mole) acetanilide and 582.5 g. (5 moles) chlorosulfonic acid was diluted with 55 ml. water at 30–35° C. reaction temperature. 27 ml. of ethylene dichloride was added after evolution of the HCl had ceased. 300 ml. of water was added with the reaction temperature maintained at the same range. p(N-acetyl amino) benzene sulfonyl chloride separated as an oil which crystallized after stirring for 15 minutes. The reaction mixture was cooled to 25° C. and filtered. The filter cake was washed with water to a pH of 6. 168 gms. of dry product was obtained from 185 g. of wet cake, having a melting point of 145.5–146° C. representing a yield of 72%. The filtrate was heated to 110–118° C. for 4 hours, cooled and filtered. 20 gms. of sulfanilic acid was recovered along with 650 g. of 57.5% $H_2SO_4$. The HCl gas on scrubbing with water gave 200 g. of 34% strength.

When the reaction mixture is added to ice as is done conventionally the p(N-acetyl amino) benzene sulfonyl chloride is of greatly inferior quality and the cake contains much more water because of the flocculent crystals. The other products are all lost in the form of a dilute solution which makes their recovery unfeasible.

*Example II*

A reaction mixture similar to Example I was treated in the same manner except that 110 grams of 50% $H_2SO_4$ was used instead of the 55 ml. water. A similar yield was also obtained.

*Example III*

A reaction mixture obtained from 112.5 g. (1 mole) chlorobenzene and 350 g. (3 moles) chlorosulfonic acid was diluted with 29 ml. of water with the reaction mixture temperature going to 60° C. After cooling the p-chlorobenzene sulfonyl chloride was recovered in good yield of about 72%.

Remaining traces of water can be removed from the final sulfonyl chloride products by heating in a warm air furnace. This is possible only because of the large crystals and small water content of the products of this process or contrasted with the materials of the prior art.

The advantages of this invention are apparent to those skilled in the art. p(N-acetyl amino) benzene sulfonyl chloride and other similar products are obtained in the form of large crystals which are in relatively anhydrous form and easy to filter. In addition product and byproduct degradation are avoided so that distinct credits accrue to the process. Savings in organic solvents are also realized.

It is to be understood that this invention is not limited to the specific examples which have been offered merely as illustrations and that modifications may be made without departing from the spirit of the invention.

What is claimed is:

1. A process for recovering and purifying p(N-acetyl amino) benzene sulfonyl chloride and obtaining it in relatively anhydrous form, said p(N-acetyl amino) benzene sulfonyl chloride having been prepared from the reaction of chlorosulfonic acid and acetanilide, and being present in the resultant reaction mixture comprising a solution of p(N-acetyl amino) benzene sulfonyl chloride, chlorosulfonic acid and sulfuric acid which comprises adding water slowly to the reaction mixture in an amount sufficient only to react with all of the free chlorosulfonic acid so as to decompose it and evolve HCl, then after HCl evolution has ceased adding additional water in an amount only about sufficient to precipitate substantially all the sulfonyl chloride and maintain the other materials in solution, adding to the reaction mixture an organic solvent for the sulfonyl chloride which is immiscible with and unreactive with sulfuric acid in the system after the water addition step to facilitate product crystal growth, the solvent being utilized in an amount of about 10 to 15 wt. percent based on the dry sulfonyl chloride product obtained, aging the resultant mixture for a minimum time of about 30 minutes to further facilitate product crystal growth while the temperature is maintained in the range of 20–60° C., and separating the p(N-acetyl amino) benzene sulfonyl chloride crystals from the residual solution.

2. A process for recovering and purifying p(N-acetyl amino) benzene sulfonyl chloride and obtaining it in relatively anhydrous form, said p(N-acetyl amino) benzene sulfonyl chloride having been prepared from the reaction of chlorosulfonic acid and acetanilide, and being present in the resultant reaction mixture comprising a solution of p(N-acetyl amino) benzene sulfonyl chloride, chlorosulfonic acid and sulfuric acid which comprises adding water slowly to the reaction mixture in an amount sufficient only to react with all of the free chlorosulfonic acid so as to decompose it and evolve HCl, then after HCl evolution has ceased adding additional water in an amount only about sufficient to precipitate substantially all the sulfonyl chloride and maintain the other materials in solution, adding to the reaction mixture an organic solvent for the sulfonyl chloride selected from the group consisting of ethylene dichloride, chloroform and nitropropane to facilitate product crystal growth, the solvent being utilized in an amount of about 10 to 15 wt. percent based on the dry sulfonyl chloride product obtained, aging the resultant mixture for a minimum of about 30 minutes to further facilitate product crystal growth while the temperature is maintained in the range of 20–60° C. and separating the p(N-acetyl amino) benzene sulfonyl chloride crystals from the residual solution.

3. The process of claim 1 in which the water added is in the form of a dilute aqueous inorganic acid selected from the group consisting of HCl and $H_2SO_4$.

4. The process of claim 1 including the additional step of recovering evolved HCl from the reaction mixture to which water has been added.

5. The process of claim 1 including the additional step of heating the residual reaction mixture after the separating of the p(N-acetyl amino) benzene sulfonyl chloride to a temperature in the range of 110 to 120° C. to precipitate sulfanilic acid and separating the sulfanilic acid from this mixture.

References Cited in the file of this patent

UNITED STATES PATENTS 2,508,930    Richmond  --------------  May 23, 1950

FOREIGN PATENTS 224,386    Germany  --------------  July 20, 1910
119,960    Austria  --------------  Nov. 25, 1930

OTHER REFERENCES

Suter: Org. Chem. of Sulfur, pages 475–6 (1944).